July 20, 1943.   F. L. BRANDT   2,324,479
FASTENING-INSERTING MACHINE
Filed Dec. 29, 1941   3 Sheets-Sheet 3
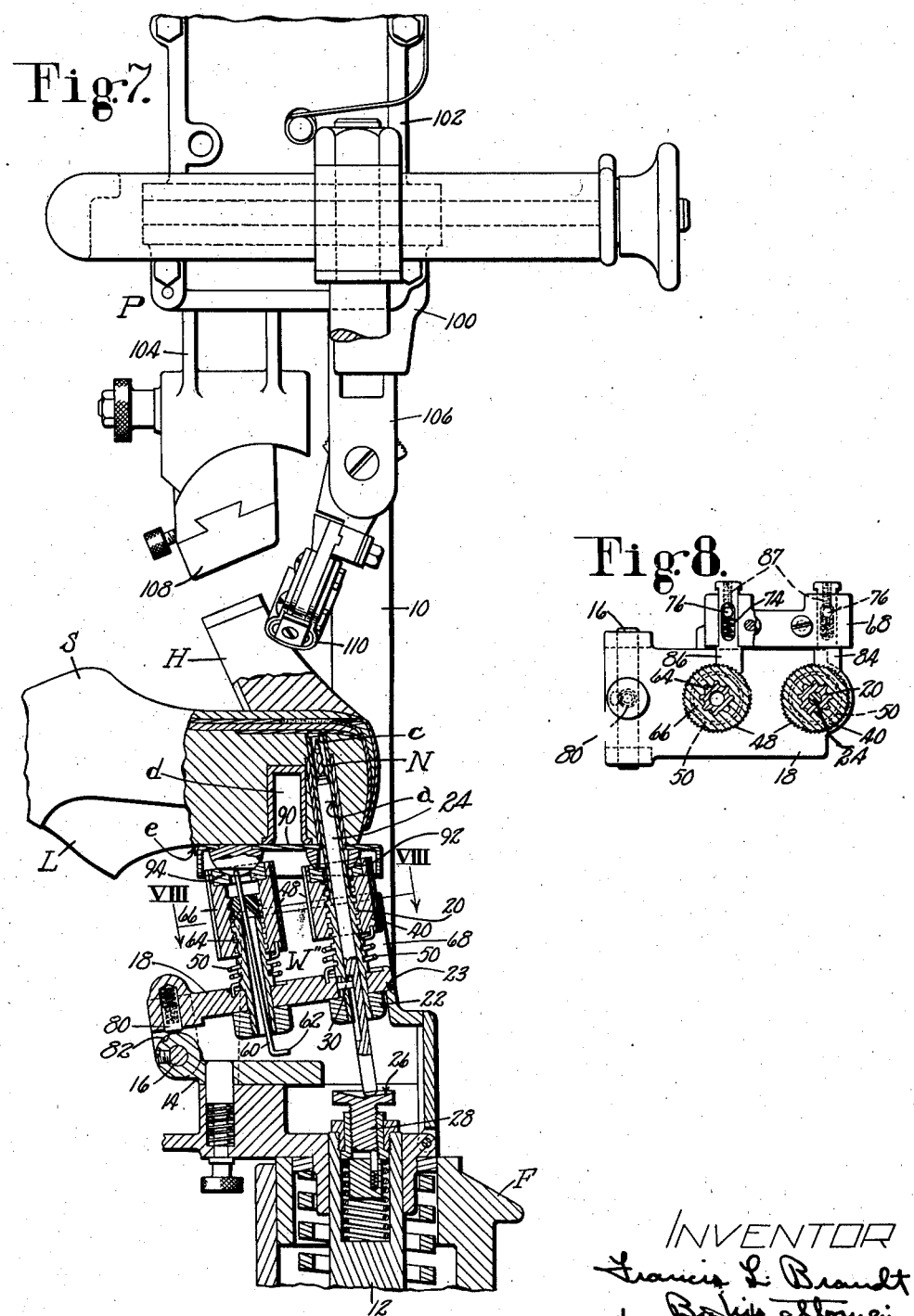

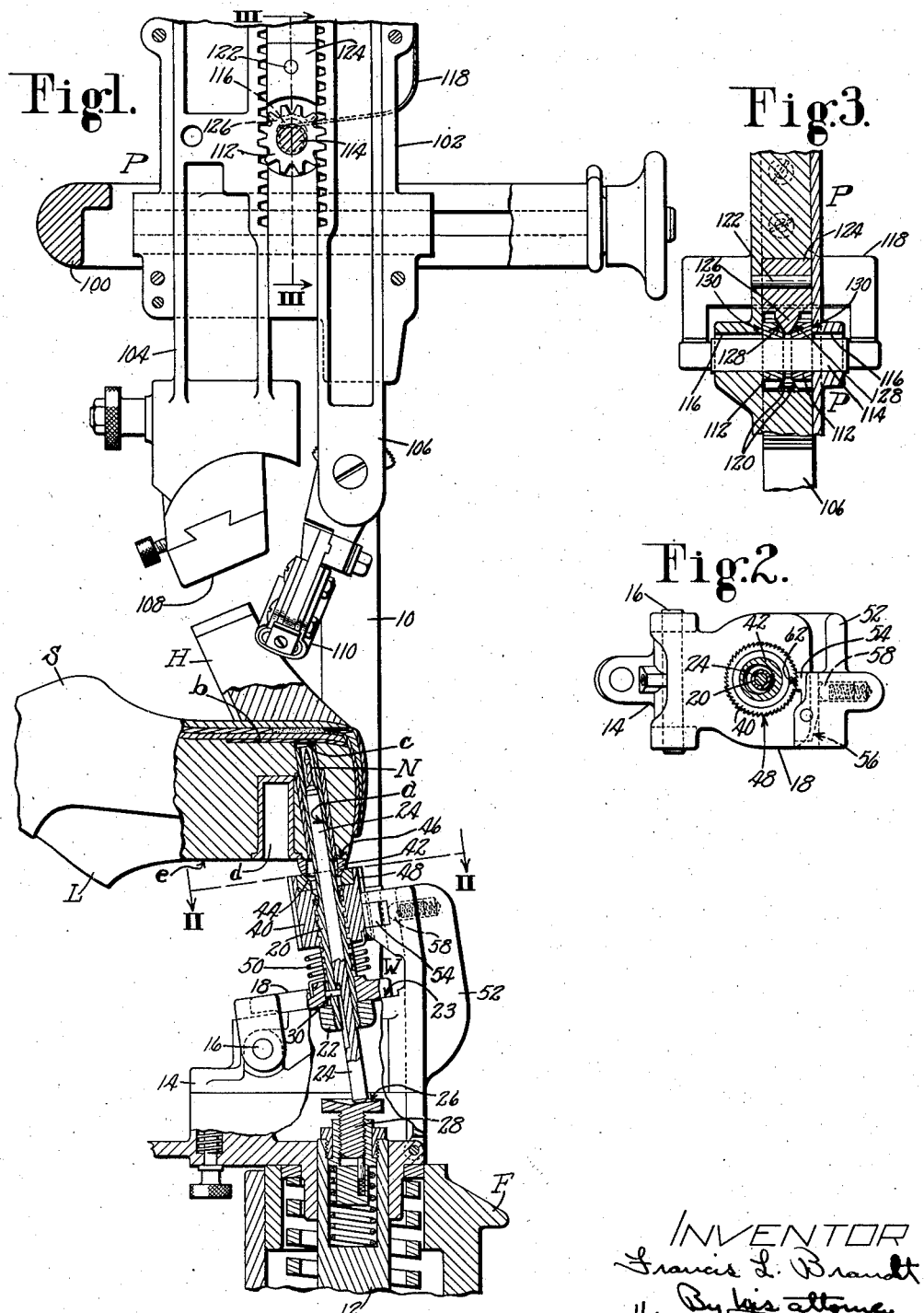

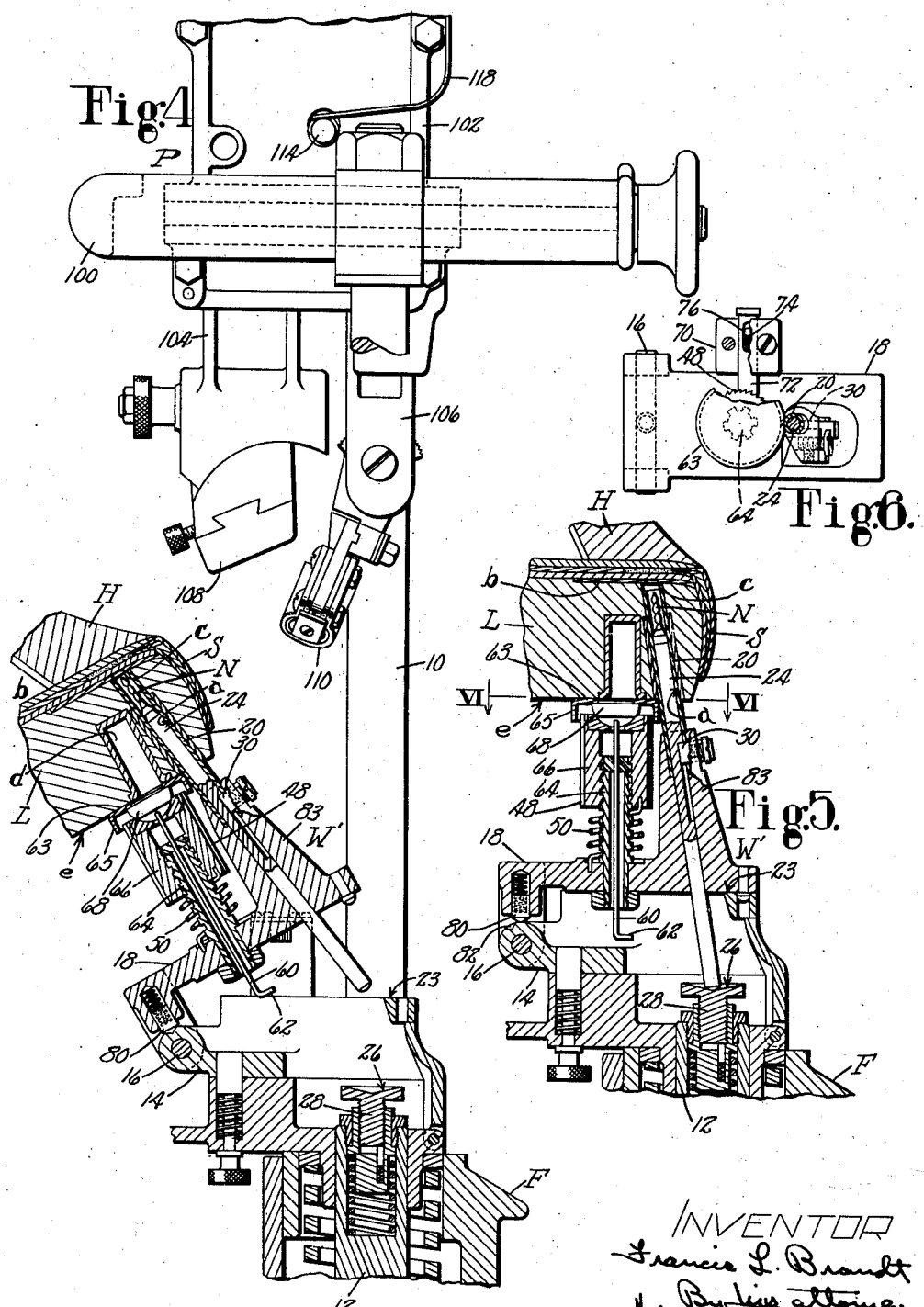

Patented July 20, 1943

2,324,479

UNITED STATES PATENT OFFICE 2,324,479

FASTENING-INSERTING MACHINE

Francis L. Brandt, Bridgeport, Conn., assignor to United Shoe Machinery Corporation, Flemington, N. J., a corporation of New Jersey Application December 29, 1941, Serial No. 424,740

37 Claims. (Cl. 1—32)

My invention relates to machines for inserting fastenings, and especially to those employed for attaching heels to shoes.

A known form of apparatus for the attachment of heels, utilizes a spindle adapted to receive a passage through the cone of a last within a shoe to be operated upon. When pressure is applied to hold the work against displacement, as the attaching fastening is being inserted by a driver reciprocated in a passage through the spindle, the work, which may be considered to include the last, is forced against said spindle. If the spindle passes through the last-passage, it may objectionably indent the insole of the shoe. If the pressure is taken upon a shoulder furnished by a portion of the last overhanging the passage, this shoulder may become deformed. An object of my invention is to prevent all damage of this character to the work. To this end, there is provided a plurality of members, one of which supports the work initially, while another is moved to elevate the work from the supporting surface of the initial support while said initial support continues to exert a positioning action. Thus, the lasted shoe may be located upon a jack with an applied heel, ready to receive clamping pressure produced by relative movement between it and a heel-abutment, and then so relieved of this pressure that no injury will result. A carrier, forming a part of the work-support or jack, may have a portion, as a supporting spindle, adapted to receive the last-passage, while upon this carrier such a rotatable member as a nut, may have a threaded mounting for movement in engagement with the last, thus raising the work upon the spindle. The rotation of the nut is preferably effected by movement of the carrier, which is herein shown as pivoted upon a base-section. When the carrier is swung in from a work-receiving position to an operating position, teeth upon the nut may be engaged by a pawl yieldable upon the base. The resulting rotation of the nut causes it to be elevated along its threaded mounting in contact with the crown of the last-cone, which is capable of sustaining the pressure without injury. The nut is normally urged toward the spindled last, to be initially depressed by it, as by a spring interposed between the carrier and the nut. For direct engagement with the last-cone, the nut preferably carries, as a portion of it, a last-bed-piece, so mounted by a universal joint or otherwise, that it may rock to furnish a contact-surface for the nut which will accommodate itself to the work-surface engaged. The means by which the work is raised from the end of the last-entering spindle may assume various forms. For example, said spindle may be threaded to receive the elevating member or nut. If this furnishes inadequate support to resist the clamping pressure, a second spindle may project from the carrier in front of the first spindle and the nut be threaded upon this, it engaging the crown of the last-cone where it more effectively resists displacement of the work. The nut, thus mounted, is actuated in a manner generally similar to the first. Still another form may utilize both the preceding arrangements of nuts, these being actuated simultaneously by two pawls yieldable upon the base for co-operation with teeth upon the respective nuts.

Further objects of the invention have to do with the establishment of a correct relation between the spindled work and the pressure means, and with the provision in this pressure means or heel-holddown of effective means for locking against relative movement the compensating heel-engaging members.

In the accompanying drawings there are illustrated portions of a heel-attaching machine including the three above-indicated arrangements of my improved work-support, among those possible:

Fig. 1, showing in broken side elevation that form in which the work-elevating nut is threaded upon the last-entering spindle;

Fig. 2 is a section on the line II—II of Fig. 1;

Fig. 3, a vertical sectional detail on the line III—III of Fig. 1;

Fig. 4, a view similar to Fig. 1, but illustrating the nut as carried by a second spindle and with the jack in its work-receiving position;

Fig. 5, a like view of the jack in operating position;

Fig. 6, a section on the line VI—VI of Fig. 5;

Fig. 7, a view similar to Fig. 1, but in which are included the work-elevating nuts of both Fig. 1 and Fig. 4; and Fig. 8 is a section on the line VIII—VIII of Fig. 7.

As in Letters Patent of the United States No. 2,286,195, Brandt, June 16, 1942, the present machine has a frame F, upon which is mounted a work-supporting jack W and a co-operating heel-holddown or pressure device P, carried by spaced side-rods 10, 10 guided for vertical reciprocation in the frame. The pressure device is movable both by the operator to establish preliminary engagement of the abutment-surfaces of the holddown with a heel applied to the heel-seat of a jacked shoe, and then under the power of the machine to create clamping pressure resisting the insertion of the attaching fastening. In the frame below the work-support, a driver-actuating plunger 12 is movable.

Separably mounted in horizontal ways in the frame is a base-section 14 of the support or jack W, upon which is pivoted at 16 an upper carrier-section 18, which may be swung from a forward work-receiving position to a rearward operating position. These two positions are shown in Figs. 4 and 5, respectively. Rising from the carrier 18 near the rear is a tubular spindle 20, secured in place by a nut 22 (Figs. 1 and 7) and adapted to receive at its upper extremity a passage $a$ through the rear of a last L within a shoe S. This passage is preferably at the rear of the pin-hole $d$, it corresponding to that through which is customarily inserted a screw for temporarily holding a heel H upon the heel-seat of a shoe, while an interposed adhesive sets. Since this passage is inclined outwardly and rearwardly through the crown of the last-cone, and since the holddown P travels vertically, I so limit the movement of the carrier-section 18 by its contact at 23 with the base 14, that, when it is in operating position, the spindle is inclined upwardly and forwardly, so the inclination of the last-passage $a$ is compensated for and the heel-seat of the spindled shoe will be in a generally horizontal plane. It is thereby so located that the vertically moving holddown P will correctly engage the heel which it is to clamp. When the last L is fully seated upon the spindle, the end of the latter is shown as engaged by a shoulder $c$ upon the last-plate $b$, this shoulder overhanging the passage $a$. The work is thus initially located for the operation upon it, which consists in inserting such a fastening as a nail or driving screw N, through the heel-seat of the shoe S into the heel H. The insertion is effected by a driver 24, guided in the passage through the spindle 20. In the operating position of the carrier 18, the lower extremity of the driver rests upon the upper face 26 of a contact member 28, adjustable in the actuating plunger 12. The face 26 is concave, to furnish an engaging surface which is substantially at right angles to the axis of the driver. This driver may be held against accidental separation from the spindle by a pin or key 30, fixed in said spindle and lying in a slot extending along the driver.

To prevent mutilation of the work, as the deformation of the shoulder $c$ upon the last-plate when the holddown P applies pressure, an auxiliary support is provided. Referring particularly to Figs. 1 and 2 of the drawings, this support consists of a nut 40 threaded upon the exterior of the last-entering spindle 20. Forming a part of this nut is a bed-piece 42, preferably mounted to rock universally by a ball-and-socket joint 44 upon the top of the nut and having an upper plane surface 46 to support the crown $e$ of the spindled last-cone. About the periphery of the nut are formed ratchet-teeth 48 of considerable vertical extent. The nut is held in a normal raised position upon the spindle by a light torsion- and expansion-spring 50, interposed between the carrier and the nut. The range of movement permitted by the spring is sufficient to ensure the proper contact of the last with the bed-piece of the nut for cones of all heights. This normal position of the nut is such, that before the last-plate-shoulder $c$ has reached the end of the spindle 20 when the work is applied to the support W in its forward work-receiving relation, the crown $e$ of the last-cone will have contacted with the surface 46 of the last-bed-piece, depressing the nut. Rising from the base 14 at the rear of the carrier is a bracket 52, and pivoted in the upper portion of this bracket is a pawl 54, inclined somewhat forwardly and downwardly. This pawl is urged normally toward the teeth upon the nut, to an extent permitted by engagement of a surface 56 upon it with an opposed surface on the bracket, by a spring-actuated plunger 58 movable in said bracket.

When the operator, having spindled the work upon the support, tilts it rearwardly about the pivot 16, and as the movement approaches completion, the teeth 48 upon the nut 40 will mesh with teeth 62 upon the pawl. This movement of the support may continue, with a corresponding movement of the pawl about its pivot, until the operating position is reached. During the oscillation of the support, with the teeth of the nut 40 in mesh with those of the pawl, said nut will be turned upon the spindle through an angle corresponding to the pawl-displacement. It is thereby raised upon the threaded spindle 20, and the engagement of its last-bed-piece 42 with the crown of the last-cone will lift the shoulder of the last-plate from the end of the spindle. Upon the application of pressure to the work by the holddown P, the force is received upon a work-surface which is amply able to withstand it without injury. After the insertion of the fastening N by the driver 24 actuated by the plunger 12 and the retraction of the holddown, the forward movement of the support for the removal of the completed work separates the teeth of the nut from the pawl, which is restored to normal position by the plunger 58, while the nut is elevated to its initial position by the spring 50.

In the use of the work-elevating arrangement just described, in which the last-receiving spindle furnishes the mounting for the nut, upon the application of considerable holddown-pressure there may be a tendency for the lasted shoe to be displaced forwardly. This may be due to the forward inclination of the spindle 20 with respect to the vertical movement of the holddown P and the relatively small diameter of said spindle, which is to receive the last-passage $a$, the spindle yielding laterally somewhat under the applied pressure. If this occurs, the heel may be displaced from its correct relation upon the heel-seat of the shoe. Any such tendency may be compensated for by locating the work-supporting nut beneath the forward portion of the crown of the last-cone. This arrangement is shown in Figs. 4, 5 and 6 of the drawings. In the carrier 18 of the work-support W', in front of the last-supporting spindle 20, a spindle 64 is fixed, this being vertical when the carrier is in operating position (Fig. 5). Threaded upon the spindle 64 is a nut 66, which is spring-supported and toothed similarly to the nut 40, with a last-bed-piece 68 mounted to rock upon its upper extremity. To prevent accidental displacement of the bed-piece from the spindle 64, there may be connected to its underside a wire or flexible member 60, passing through a bore in the spindle and hooked at 62 beneath the lower extremity of the spindle. The bed-piece, therefore, is retained against falling from the spindle, and the length of the wire is such that the yield of the nut is not interfered with. Greater last-engaging area is given to the bed-piece by the inclusion of an upper plate 63 secured to it, and which may be provided with a depending flange 65 aiding in the retention of the bed-piece upon the nut. A bracket 70 projects upwardly from the base 12 at one side of the carrier, and has guided at the top, to yield horizontally through it, a toothed pawl 72 urged normally forward by an expansion-spring 74, situated between the pawl and a pin 76 set in the bracket. During the later portion of the angular movement of the carrier from its work-receiving position (Fig. 4), until it seats itself in operating position upon the base 12 (Fig. 5), the teeth upon the nut mesh with those upon the pawl and rotate said nut sufficiently to elevate the shoulder c of the last-plate from the upper extremity of the spindle 20. There is thus provided for the work a support, the vertical axis of which is in substantial registration with the line of application of pressure by the hold-down P. There is consequently no tendency for the work to yield laterally, and the heel to become displaced upon the heel-seat. Further, since the axes of the spindles 20 and 64 converge upwardly, the application of pressure by the nut 66 toward the front of the last-cone-crown tends to tilt the last upon its receiving spindle. This cramps the last upon said spindle, taking up any clearance which may exist and increasing the security of work-retention.

Included in this form of the invention is shown means for limiting the forward movement of the support W' to work-receiving position and there yieldably retaining it. This consists of a spring-actuated plunger 80, movable in the pivot-portion of the carrier 18 and having a pointed outer end. This end, when the support is swung out by the operator, will enter a complemental depression 82 in the adjacent curved wall of the base 14. The support is thus held, so the hands of the operator are left free for spindling the work and applying the heel. When this is accomplished, rearward pressure upon the support releases the plunger from the depression, so the supported work may be carried to operating position. The arrangement is further modified over that previously described, by shortening the spindle 20 and fixing it in a standard 83, rising from the rear of the carrier 18 and inclined forwardly from the vertical.

An even greater stability may be given to the auxiliary work-supporting means by a combination of the two previously mentioned organizations. This arrangement is illustrated in Figs. 7 and 8. It will be seen that the support W'' has both the threaded last-entering spindle 20 with the nut 40 of Figs. 1 and 2, and the second forward spindle 64 with the nut 66 of Figs. 4, 5 and 6. Engaging the teeth of the nuts 40 and 66 are the respective pawls 84 and 86, yieldable side by side upon a bracket 68 rising from the base 14 at one side of the carrier 18. These are similar in location and action to the pawl 72 of Figs. 4 to 6, except that the times at which they are effective may be varied. This is achieved by threading through the outer ends of the pawls screws 87, 87 contacting with the pins 76, 76. By advancing one pawl more than the other, through adjustment of the screws, the cramping effect upon the last, produced by the differential elevation of the nuts upon their spindles as the support W'' is swung back into operating position, may be controlled. No further description of this embodiment of the invention is thought necessary, other than to say that here the last-bed-piece is in the form of a plate 90 extended over both nuts 40 and 66 and mounted upon universal joints 92 and 94, respectively. By this means, the greater portion of the crown of the last-cone is engaged by the supporting plate, and a highly effective resistance is offered to displacement of the work upon the application of clamping pressure, after both nuts have raised the last-plate-shoulder c from engagement with the end of the spindle 20.

In connection with any one of the work-supports which have been described, I prefer to employ the pressure device P which is illustrated in detail in Figs. 1 and 3 of the drawings. Mounted upon the side-rods 10 is a head 100, upon which is adjustable from front to rear of the machine a carrier-slide 102. This carrier-slide is in the form of a casing, in which parallel racks 104 and 106 reciprocate vertically. The front rack 104 carries at its lower extremity an abutment 108 for contact with the tread-surface of the heel H, which is being attached to the shoe S. The rear rack 106 is provided with a fork 110 for engagement with the rear of the heel. As in the well known compensating heel-holddown, the racks are geared to move in opposite directions, but in the present instance this connecting gearing is in the form of a pinion divided into two sections 112, 112. These sections have a bearing upon a horizontal spindle 114, guided in and extending through vertically elongated openings or slots 116, 116 in opposite walls of the casing, and held normally at the bottoms of the slots by a leaf-spring 118 attached to the casing and divided to rest upon the oppositely projecting ends of the spindle. The pinion-sections are loose upon the spindle, but rotate together because they are in mesh with the two racks. They have, however, a limited lateral movement along the spindle. Upon their inner sides there are inclined circular surfaces 120, 120, diverging outwardly from each other. Secured between the sides of the casing upon a pin 122 is a block or contact member 124, upon which is a segmental projection 126 extending between the pinion-surfaces 120 and having surfaces 128, 128 complemental to them. Normally, with the shaft and pinion-sections held down by the spring 118, the surfaces 120 are separated slightly from the surfaces 128. When the head 192 is lowered by the side-rods 10 to clamp the applied heel upon the heel-seat of the shoe, the abutment 108 first engages the tread-surface of the heel, and, through the rack 104, pinion-sections 112 and rack 106, the fork 110 is carried down into contact with the inclined rear of the heel. Then, as the pressure is equalized, the spindle 114 is held against movement while the descent of the head continues, as permitted by the slots 116. This relative movement of translation between the carrier and the pinion-sections promptly brings the contact-surfaces 128 of the block 124 against the pinion-surfaces 120. At the same time, the wedge-shape of the projection 126 forces the pinion-sections apart and their outer faces 130 against the adjacent walls of the casing 102. The frictional engagement of both the inner and outer surfaces of the pinion-sections with the relatively fixed surfaces, effectively locks said sections against rotation and prevents relative movement between the racks 104 and 106. As a result of this, continued descent of the head 100 applies equal pressure to the work through both racks, and there can be no unbalanced force acting through either rack, which might displace the heel upon the heel-seat or injure it.

The operation of any one of the three embodiments of my invention, which have been described, may now be outlined as follows: With the work-support in its forward position, the operator supplies a nail, point up upon the end of the driver in the last-receiving spindle, and applies the passage through a last within a shoe to said spindle, lowering the work until the overhanging shoulder of the last-plate is in contact with the upper extremity of the spindle. The crown of the last-cone engages the last-bed-piece upon the spindle-mounted nut or nuts, displacing these against their springs. The support with the lasted shoe is then tilted rearwardly into operating position. In this movement, the pawl or pawls co-operate with the nut-teeth, rotating the nuts upon their threaded mountings. The last-bed-piece is thereby urged upward against the last-cone, removing the last-plate-shoulder from engagement with the spindle, to relieve this portion of the work from all deforming pressure which may be applied by the holddown. A heel is placed upon the heel-seat of the shoe and the holddown lowered through the treadle of the machine, to establish preliminary engagement of its rear and tread-abutments with the heel, these abutments being locked against relative movement by the separation of their connecting pinion-sections when the pressure is equalized. Continued actuation of the treadle starts the power-cycle of the machine; the holddown applies clamping pressure to the work; and the attaching nail is driven from the last-entering spindle through the heel-seat of the shoe into the heel. The driver and holddown are retracted in the completion of the cycle; the work-support is swung outwardly; and the heeled shoe removed from the spindle.

Having described my invention, what I claim as new and desire to secure by Letters Patent of the United States is:

1. A shoe-support comprising a plurality of members one of which supports and positions a shoe initially, and means for moving another of the members to support the shoe and to elevate it from the supporting surface of the initial support while said initial support continues to exert a positioning action upon the shoe.

2. A shoe-support comprising a base-section, a second section movable upon the base section into and out of operating position, a work-supporting member fixed upon the second section, a second work-supporting member movable upon the second section, and means made effective in the movement of the second section for moving the second work-supporting member upon said section into work-supporting relation.

3. In a heel-attaching machine, a jack, and a heel-abutment co-operating therewith, the jack and abutment being movable relatively to apply pressure to the work, said jack having two supporting members one of which supports the work initially while the other is movable to relieve the first member of substantially all the applied pressure.

4. A jack comprising a carrier having a portion adapted to receive a passage in a last within a shoe, a rotatable member having a threaded mounting upon the carrier, and means for rotating the member in engagement with the last.

5. A jack comprising a carrier, a threaded spindle projecting from the carrier and adapted to receive a passage in a last within a shoe, a nut rotatable upon the spindle, and means for rotating the nut in engagement with the last.

6. A jack comprising a carrier, a threaded spindle projecting from the carrier and adapted to receive a passage in a last within a shoe, a nut having a threaded mounting upon the carrier, means for urging the nut toward the spindled last, and means for rotating the nut in engagement with the last.

7. A jack comprising a carrier, a threaded spindle projecting from the carrier and adapted to receive a passage in a last within a shoe, a nut rotatable upon the spindle, a spring interposed between the carrier and the nut, and means for rotating the nut in engagement with the last.

8. A jack comprising a movable carrier having a portion adapted to receive a passage in a last within a shoe, a rotatable member having a threaded mounting upon the carrier, and means effective in the movement of the carrier for rotating the member in engagement with the last.

9. A jack comprising a base, a carrier movable upon the base, a work-supporting spindle projecting from the carrier, a nut having a threaded mounting upon the carrier, and means made effective in the movement of the carrier for rotating the nut to support the work.

10. A jack comprising a base, a work-supporting carrier pivoted upon the base for movement into and out of operating position, a threaded work-supporting spindle projecting from the carrier, a nut threaded upon the spindle, and means made effective in the movement of the carrier into operating position for rotating the nut upon the spindle in engagement with the work.

11. A jack comprising a base, a carrier pivoted upon the base for movement into and out of operating position, a threaded spindle projecting from the carrier and adapted to receive a passage in a last within a shoe, a nut rotatable upon the spindle, and means made effective in the movement of the carrier into operating position to rotate the nut upon the spindle in engagement with the crown of the last-cone.

12. In a heel-attaching machine, a base, a carrier movable upon the base, a tubular spindle projecting from the carrier and adapted to receive a passage in a last within a shoe, a driver reciprocable in the spindle, a nut having a threaded mounting upon the carrier, and means made effective in the movement of the carrier for rotating the nut to raise the last upon its spindle.

13. A jack comprising a base, a carrier movable upon the base, a work-supporting spindle projecting from the carrier, a nut having a threaded mounting upon the carrier and provided with teeth, and a pawl mounted upon the base and engaging the teeth in the movement of the carrier to rotate the nut in engagement with the work.

14. A jack comprising a base, a carrier pivoted upon the base for movement into and out of operating position, a threaded spindle projecting from the carrier and adapted to receive a passage in a last within a shoe, a nut rotatable about the spindle and provided with teeth, and a pawl yieldable upon the base at the rear of the carrier and engaged by the teeth as pivotal movement of the carrier approaches completion.

15. A jack comprising a carrier provided with a portion arranged to receive a passage in a last within a shoe, a nut having a threaded mounting upon the carrier and including a last-bedpiece arranged to rock upon it, and means for rotating the nut.

16. A jack comprising a threaded spindle adapted to receive a passage in a last within a shoe, a nut rotatable upon the spindle and including a last-bed-piece seated by a universal joint upon it, and means for rotating the nut.

17. A jack comprising a carrier, a spindle projecting from the carrier and adapted to receive a passage in a last within a shoe, a second spindle projecting from the carrier, a nut threaded upon the second spindle, and means for rotating the nut in engagement with the last.

18. A jack comprising a carrier, a spindle projecting from the carrier and adapted to receive a passage in a last within a shoe, a second spindle projecting from the carrier and converging toward the last-receiving spindle, a nut threaded upon the second spindle, and means for rotating the nut in engagement with the last.

19. A jack comprising a carrier, a spindle projecting from the carrier and adapted to receive a passage in a last within a shoe, a second spindle projecting from the carrier in front of the receiving spindle, a nut threaded upon the second spindle, and means for rotating the nut in engagement with the forward portion of the crown of the last-cone.

20. A jack comprising a base, a carrier movable upon the base, a spindle projecting from the carrier and adapted to receive a passage in a last within a shoe, a second spindle projecting from the base and being threaded, a nut rotatable upon the second spindle, and means made effective in the movement of the carrier for rotating the nut in engagement with the last.

21. A jack comprising a base, a carrier pivoted upon the base for movement into and out of operating position, a spindle projecting from the carrier and adapted to receive a passage in a last within a shoe, a second spindle projecting from the carrier in front of the last-receiving spindle and being provided with a thread, a nut rotatable upon the second spindle and having teeth, and a pawl yieldable upon the base at one side of the carrier and engaged by the teeth during the movement of the carrier into operating position to rotate the nut in engagement with the last.

22. A jack comprising a carrier, a spindle projecting from the carrier and adapted to receive a passage in a last within a shoe, a second spindle projecting from the carrier, a nut threaded upon the second spindle and including a last-bed-piece seated by a universal joint upon the nut, and means for rotating the nut.

23. In a heel-attaching machine, a base, a carrier movable upon the base, a tubular spindle projecting from the carrier and adapted to receive a passage in a last within a shoe, a driver reciprocable in the spindle, a second spindle projecting from the carrier in front of the tubular spindle, a nut threaded upon the second spindle, and means made effective in the movement of the carrier for rotating the nut upon its spindle in engagement with the last to raise it upon the tubular spindle.

24. A jack comprising a carrier, a plurality of spindles projecting from the carrier one of which spindles is adapted to receive a passage in a last within a shoe, a nut threaded upon each spindle, and means for rotating the nuts to raise the last upon its spindle.

25. A jack comprising a carrier, a plurality of spindles converging outwardly from the carrier one of which spindles is adapted to receive a passage in a last within a shoe, a nut threaded upon each spindle, and means for rotating the nuts to raise the last upon its spindle.

26. A jack comprising a carrier, a spindle projecting from the carrier and adapted to receive a passage in a last within a shoe, a second spindle projecting from the carrier in front of the last-receiving spindle, a nut threaded upon each spindle, and means for rotating both nuts to raise the last upon its spindle.

27. A jack comprising a base, a carrier movable upon the base, two spindles projecting from the carrier one of which spindles is adapted to receive a passage in a last within a shoe, nuts threaded upon both spindles, and means made effective in the movement of the carrier for rotating both nuts to raise the last upon its spindle.

28. A jack comprising a base, a carrier pivoted upon the base for movement into and out of operating position, a spindle projecting from the rear of the carrier and adapted to receive a passage in a last within a shoe, a spindle projecting from the carrier in front of the last-receiving spindle, a nut threaded upon each spindle and having teeth, and two pawls yieldable upon the base and engaging the teeth during the movement of the carrier into operating position to rotate the nuts and advance them toward the last.

29. A jack comprising a base, a carrier pivoted upon the base for movement into and out of operating position, a spindle projecting from the rear of the carrier and adapted to receive a passage in a last within a shoe, a spindle projecting from the carrier in front of the last-receiving spindle, a nut threaded upon each spindle and having teeth, two pawls yieldable upon the base and engaging the teeth during the movement of the carrier into operating position to rotate the nuts and advance them toward the last, and means arranged to vary the normal positions of the pawls.

30. A jack comprising a carrier, a spindle projecting from the carrier and adapted to receive a passage in a last within a shoe, a second spindle projecting from the carrier in front of the last-receiving spindle, a nut threaded upon each spindle, a last-bed-piece supported upon both nuts, and means for rotating the nuts.

31. A jack comprising a base, a carrier pivoted upon the base for movement into and out of operating position, a spindle projecting from the rear of the carrier and adapted to receive a passage in a last within a shoe, a spindle projecting from the carrier in front of the last-receiving spindle, a nut threaded upon each spindle and having teeth, a last-bed-piece mounted upon the nuts, and two pawls yieldable upon the base and engaging the teeth of both nuts during the movement of the carrier into operating position and thereby rotating said nuts to force the last-bed-piece against the crown of the last-cone.

32. In a heel-attaching machine, a base, a carrier movable upon the base, a tubular spindle projecting from the carrier and adapted to receive a passage in a last within a shoe, a driver reciprocable in the spindle, a second spindle projecting from the carrier, a nut threaded upon each spindle, and means made effective in the movement of the carrier for rotating the nuts to raise the last upon its spindle.

33. In a machine for attaching a heel to a shoe upon a last in which last is a passage inclined outwardly and rearwardly through the crown of the last-cone, a jack having a spindle to which the lasted shoe is applied and by which it is positioned during the attaching operation, said spindle being inclined upwardly and forwardly from the vertical to present in substantially horizontal relation the heel-seat of a shoe supported upon the spindle, and a heel-holddown reciprocable vertically toward and from the jack.

34. Pressure mechanism for heel-attaching machines, comprising a carrier member, heel-engaging members movable oppositely upon the carrier member, connecting members for communicating the movement of one of the heel-engaging members to the other, the connecting members and carrier member being mounted for relative movement of translation, and means acting during such movement of translation for separating the connecting members from each other to lock them against the communication of movement between the engaging members.

35. In a heel-attaching machine, a carrier, two slides movable upon the carrier, a heel-engaging member mounted upon each slide, gearing connecting the slides and including a pinion, a bearing member guided upon the carrier and upon which the pinion is movable laterally, and a contact member acting upon relative movement between the carrier and bearing member to produce lateral movement of the pinion.

36. In a heel-attaching machine, a carrier, two slides movable upon the carrier, a heel-engaging member mounted upon each slide, gearing connecting the slides and including a pinion having two sections, a bearing member guided upon the carrier and upon which the pinion-sections may be separated from each other, and a contact member acting upon relative movement between the carrier and bearing member to separate the pinion-sections.

37. In a heel-attaching machine, a carrier, two slides movable upon the carrier, a heel-engaging member mounted upon each slide, gearing connecting the slides and including a pinion having two sections provided with opposed inclined surfaces, a bearing spindle guided upon the carrier and upon which the pinion-sections are rotatable and laterally movable, and a wedge mounted upon the carrier and engaging the inclined surfaces of the pinion-sections upon relative movement between the carrier and bearing spindle to separate said sections and force them against the carrier.

FRANCIS L. BRANDT.